(12) United States Patent
Daniele (10) Patent No.: US 10,994,806 B2
(45) Date of Patent: May 4, 2021

(54) ULTRA-FAST TRIMARAN NAVAL SHIP

(71) Applicant: Jerry Tony Daniele, Albuquerque, NM (US)

(72) Inventor: Jerry Tony Daniele, Albuquerque, NM (US)

( * ) Notice: Subject to any disclaimer, the term of this patent is extended or adjusted under 35 U.S.C. 154(b) by 4 days.

(21) Appl. No.: 16/443,151

(22) Filed: Jun. 17, 2019

(65) Prior Publication Data

US 2020/0290704 A1   Sep. 17, 2020

Related U.S. Application Data

(63) Continuation-in-part of application No. 29/679,443, filed on Feb. 6, 2019.

(60) Provisional application No. 62/732,426, filed on Sep. 17, 2018.

(51) Int. Cl.
| | |
|---|---|
| *B63B 1/12* | (2006.01) |
| *B63B 3/10* | (2006.01) |
| *B63H 5/07* | (2006.01) |
| *B63H 21/16* | (2006.01) |

(52) U.S. Cl.
CPC .............. *B63B 1/125* (2013.01); *B63B 3/10* (2013.01); *B63H 5/07* (2013.01); *B63H 21/16* (2013.01)

(58) Field of Classification Search
CPC ........... B63B 1/125; B63B 3/10; B63B 1/322; B63B 11/00; B63H 5/07; B63H 21/16; B63G 2013/027; B63G 1/00
See application file for complete search history.

(56) References Cited

U.S. PATENT DOCUMENTS

| | | | |
|---|---|---|---|
| D285,679 S | 9/1986 | Kachler | |
| 5,191,849 A | 3/1993 | Labrucherie et al. | |
| 5,529,009 A | 6/1996 | Faury et al. | |
| 5,590,616 A * | 1/1997 | Vera .................... | B63B 35/38 114/61.16 |
| 7,735,775 B2 * | 6/2010 | Ellnor .................. | B64C 39/12 244/45 A |
| 8,707,881 B2 | 4/2014 | Armstrong et al. | |
| 9,718,516 B2 | 8/2017 | Read | |
| 2002/0139284 A1 * | 10/2002 | Iacoboni ............. | B63B 15/0083 114/90 |
| 2005/0172881 A1 * | 8/2005 | Alvarez-Calderon .... | B63B 1/20 114/283 |

FOREIGN PATENT DOCUMENTS

| | | | | |
|---|---|---|---|---|
| FR | 2574746 A1 * | 6/1986 | ............ | B63B 1/125 |
| WO | DM/082 958 | 3/2014 | | |

OTHER PUBLICATIONS

Behance, Littoral Combat Ship Award Winning Concept, https://www.behance.net/gallery/22650231/Littoral-Combat-Ship-Concept, All.

(Continued)

*Primary Examiner* — Anthony D Wiest (57) ABSTRACT

An ultra-fast trimaran deep water and littoral naval ship suited to combat, search and rescue, and/or deployment operations has a plurality of semi-planing hulls connected to the underside of a deck in a trimaran configuration. Further, a plurality of propulsion stages including a cruise propulsion stage, a wind assisted propulsion stage, and a vectored direct thrust propulsion stage may be independently operated alone or in conjunction to propel the ship at various speeds suited to different situations.

12 Claims, 10 Drawing Sheets

(56) References Cited

OTHER PUBLICATIONS

Austal USA, Ics-127-data-sheets_0, https://usa.austal.com/sites/default/files/data-sheet/Ics-127-data-sheets_0.pdf, All.

* cited by examiner

ULTRA-FAST TRIMARAN NAVAL SHIP

The current application claims a priority to the U.S. Provisional Patent application Ser. No. 62/732,426 filed on Sep. 17, 2018.

FIELD OF THE INVENTION

The present invention relates generally to ships, specifically a versatile ultra-fast blue water trimaran capable of littoral and/or deep water ship operations that are suited for combat, search and rescue, and/or deployment operations.

BACKGROUND OF THE INVENTION

In present times, naval forces must be prepared against a wide range of technological and primitive naval threats. There is a growing need for effective fleet protection in the age of high-tech weapons, especially in narrow seas, such as the Red Sea, among others. The present invention aims to address this demand, by uniquely and collectively incorporating new naval architecture in to various existing components and technologies to create a new breed of ships. The versatile military, commercial, and civilian mission capabilities, structural configuration, and propulsion performance systems of the present invention are significantly different compared to existing fast ships. The present invention is a naval vessel that can assist in providing an effective defense against surface ships, submarines, and aerial weapon platforms, i.e. anti-ship missiles. The present invention provides fleet protection outside of current naval defense perimeters. The present invention can engage enemy forces well beyond the fleet's area of operation, thereby seriously depleting enemy forces effectiveness and strength long before they are able to effectively engage the fleet. Utilizing mature composite materials, the present invention is inexpensive to produce, reliable, easily operated, easily maintained, easily repaired and most importantly it is uniquely, ultra-fast one hundred fifty knot speed. The present invention can also be an effective element to Rapid Force Deployment Operations. The present invention can provide close to shore insertion and extraction operations in support of Navy Seal teams, in addition to blue water operations. The Ultra-Fast capabilities and long range of the present invention allows for quick and stealthy delivery Seal Teams, while still having the option of remaining within over-the-horizon striking range. The present invention is ideal for detecting and destroying submarine threats. The present invention can also aid in smuggler interdiction operations. Its presence would be a strong deterrence to drug smugglers and any other types of smuggling operations. Search and rescue operations can also be performed by the present invention, saving lives during naval blue water operations and coastal operations. Depending on the configuration of the superstructure, another embodiment of the present invention can be capable of launching aircraft/projectiles such as: the F35B vertical takeoff aircraft, cruise missiles, and or various types of helicopters. In addition, the present invention can easily be reconfigured for various roles. The present invention can be deployed as a commercial fast ferry or smaller versions as private yachts.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood, some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a naval ship. More specifically, the present invention is a versatile deep water and littoral trimaran ultra-fast ship, or ultra-fast attack ship (UFAS) that can accommodate military, commercial, and/or civilian applications. The present invention is designed to be a military naval vessel that provides effective fleet protection/support to other naval vessels. The Ultra-Fast Attack Ship is a combat blue water and littoral trimaran that features a unique three stage propulsion system. The three stages are as follows: Independent Cruise Propulsion, Cruise Wind assisted (sails), and Ultra-Fast speed Vectored Direct Thrust Gas Turbines. In addition, the UFAS can easily be reconfigured for various mission roles. The UFAS can be deployed as a commercial fast ferry or private yacht. The UFAS uniquely and collectively incorporates new naval architecture and various existing components and technologies to create a new breed of ships. Utilizing mature composite materials, the UFAS is inexpensive to produce, reliable, easily operated, easily maintained, easily repaired and most importantly it is uniquely, ultra-fast (150 knots). The versatile military, commercial, and civilian mission capabilities, structural configuration, and propulsion performance systems of the UFAS are significantly different compared to existing fast ships.

In the preferred embodiment of the present invention, the ship houses the captain's bridge, officer's quarters, electronics, missile weapon systems, CWISP close in defense system, and various other elements. Additionally, the ship can be used for rapid deployment for naval personnel and rescue. In the preferred embodiment of the present invention, the ship is constructed out of durable composites and uses least amount of aluminum to lessen the present invention's signature. The incorporation of composites will allow for more payload and/or fuel efficiency and this translates into more ordinance on target, longer range, and more naval personnel. Additionally, thickened composite materials can also act as armor in vital areas of the ship. Lightweight composite, Kevlar, and titanium plates protect personnel and vital areas. Depending on the configuration of the superstructure, the UFAS is capable of launching aircraft such as F35B vertical takeoff aircraft, cruise missiles, and or various types of helicopters.

In general, referring to FIGS. 1-5, the preferred embodiment of the present invention comprises a deck 1, a plurality of hulls 2, a plurality of propulsion stages 3, and a superstructure 4. The deck 1 is the main, generally flat, horizontal body of the ship. More specifically, in the preferred embodiment, the deck 1 takes the form of a triangular composite wing/deck 1 system that serves as the main attachment platform for the plurality of hulls 2. In the preferred embodiment of the present invention, the deck's 1 delta wing form provides aerodynamic lift to the ship when going at ultra-fast speeds. This minimizes the hydrodynamic drag of the ship. The plurality of hulls 2 forms the lower foundation of the ship, supporting the deck 1 above water level. The superstructure 4 is an extended construction of buildings, platform, or combinations thereof that rises above the deck 1 in a distinct manner. The superstructure 4 comprises a plurality of external walls 40, and in the preferred embodiment, each of the plurality of external walls 40 is connected to the deck 1 at a 60-degree angle for radar signature reduction, ordinance deflection, and wind drag reduction. Furthermore, in the preferred embodiment each of the plurality of external walls 40 is armored through one or more various means.

The deck 1 extends longitudinally between a bow 11 and a stern 12 and extends laterally between a port side 13 and a starboard side 14. Herein, the port side 13 and starboard side 14 are meant to refer to the laterally outermost edges of the deck 1. Further, the deck 1 is laterally symmetric about a longitudinal centerline 15, wherein the longitudinal centerline 15 laterally bisects the deck 1. The superstructure 4 is connected to a topside 16 of the deck 1, and may contain or comprise sections such as a bridge, control tower, observation deck 1s, operational centers, work stations, and the like.

Figure 10:
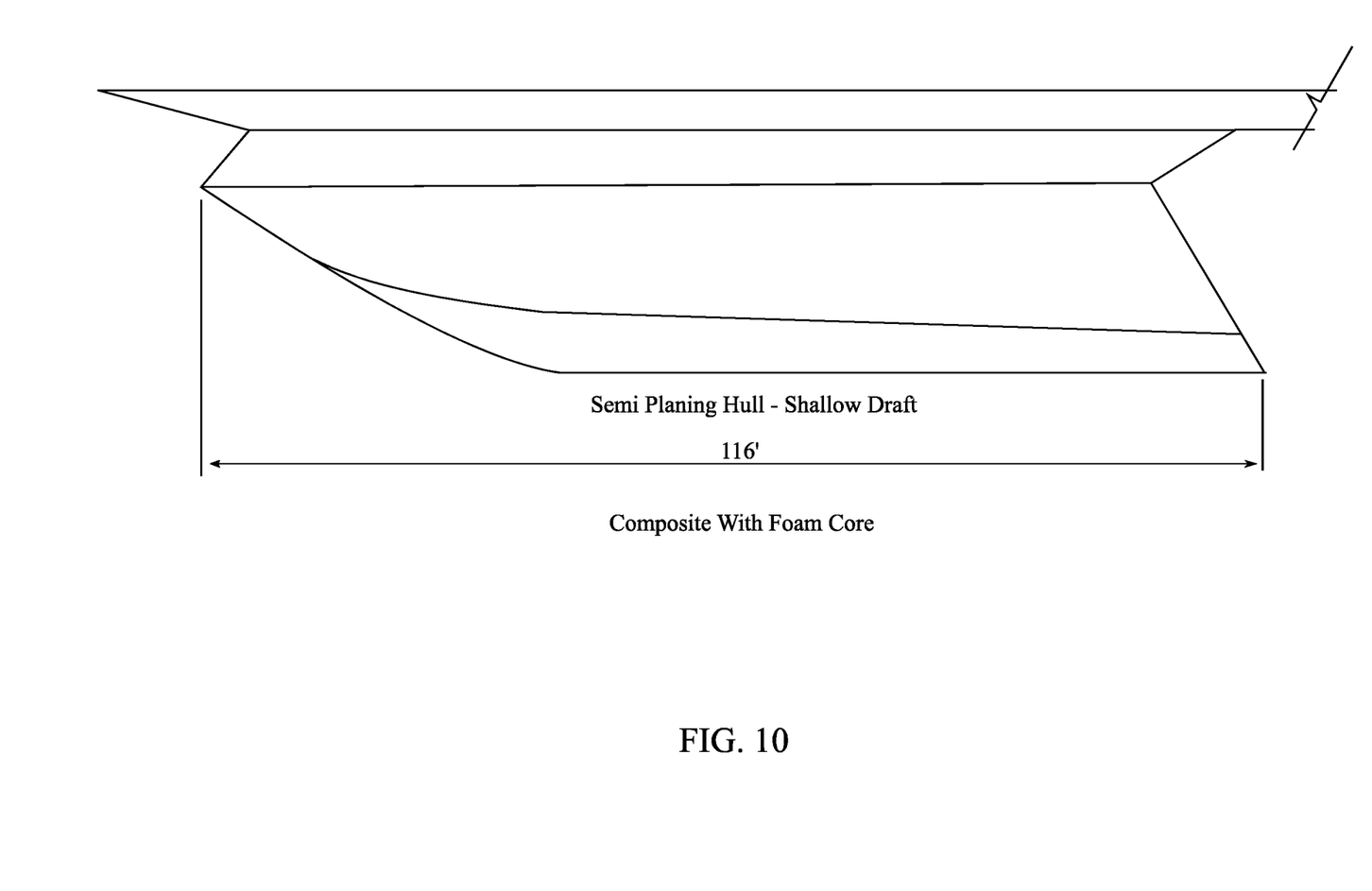
FIG. 10 is an illustration of one of the semi planing hulls showing its shallow draft.

In the preferred embodiment of the present invention, each of the plurality of hulls 2 is a light weight semi-planing hull. Further, in the preferred embodiment, each of the plurality of hulls 2 is designed with 20 to 25-degree angular cuts in the deck 1 rise to assist in slicing through waves. The cut angle incorporated into the plurality of hulls 2 lessens as it reaches the stern 12 to allow for efficient planing, as seen in FIG. 10. Each of the plurality of hulls 2 is connected to an underside 17 of the deck 1 opposite the superstructure 4, is oriented longitudinally, and is laterally symmetrical in the preferred embodiment. However, it is contemplated that in some embodiments, one or more of the plurality of hulls 2 may not be laterally symmetrical.

Figure 1:
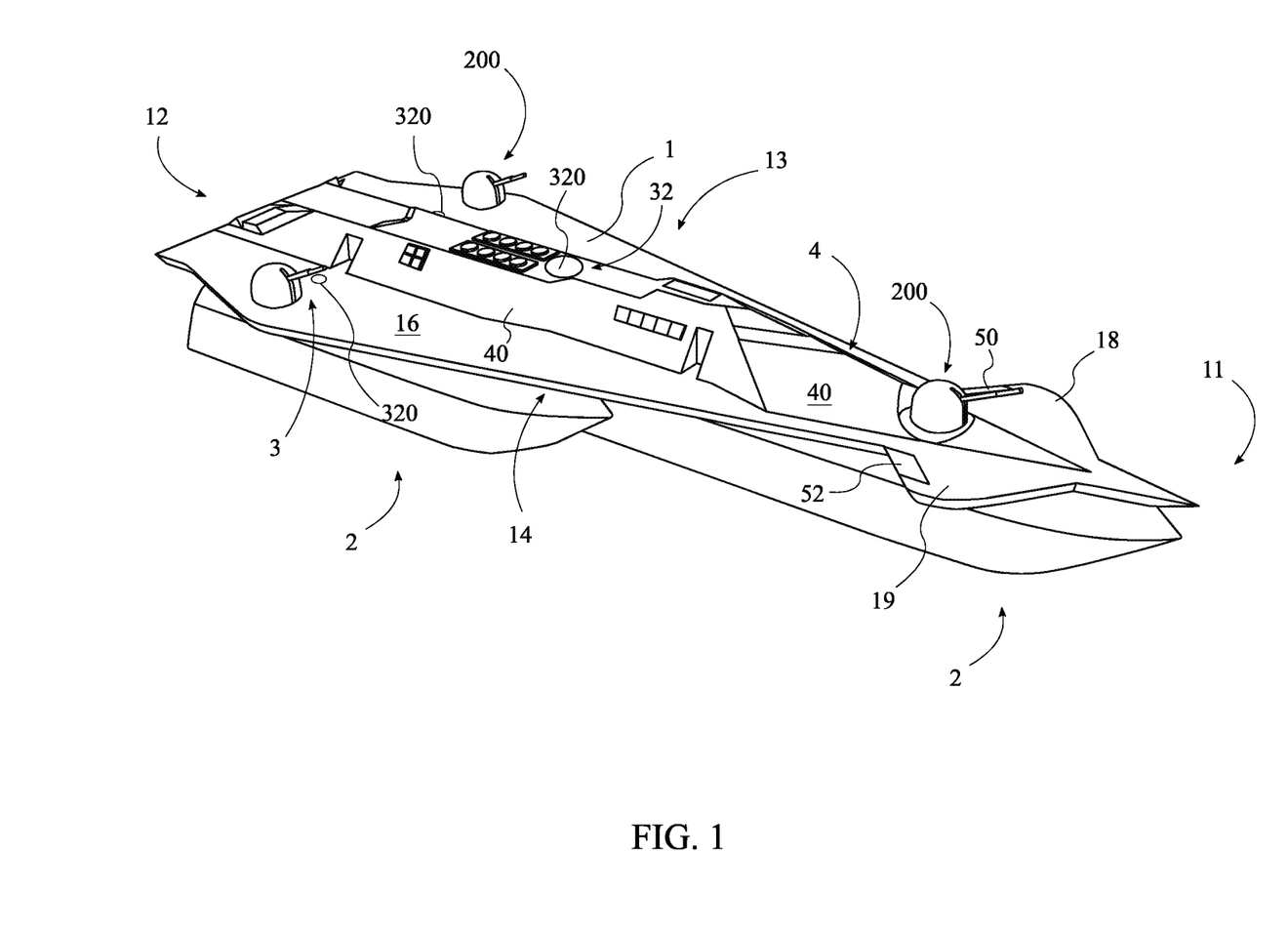
FIG. 1 is a raised perspective view of one embodiment of the present invention.
Figure 2:
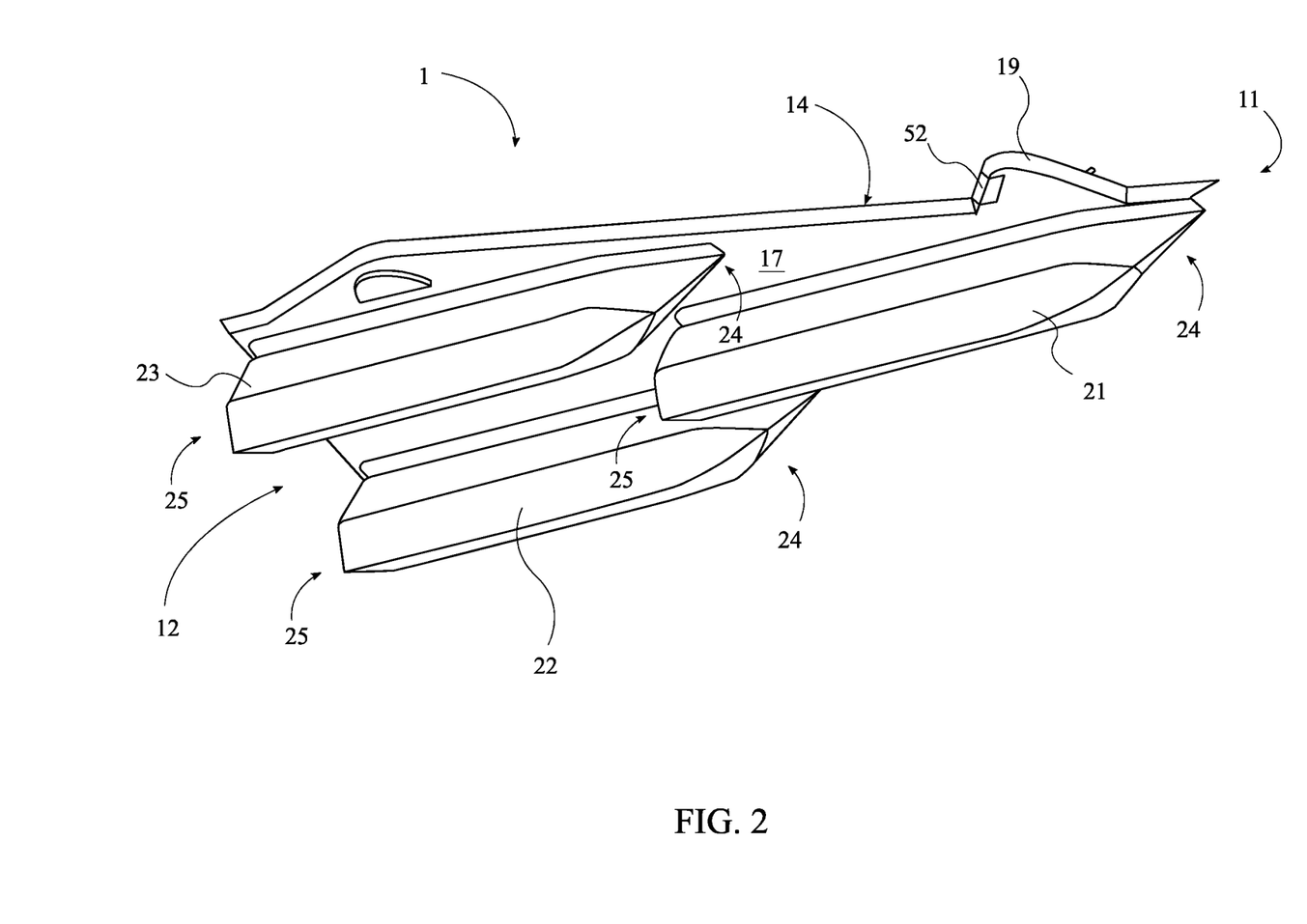
FIG. 2 is a lowered perspective view of one embodiment of the present invention.
Figure 5:
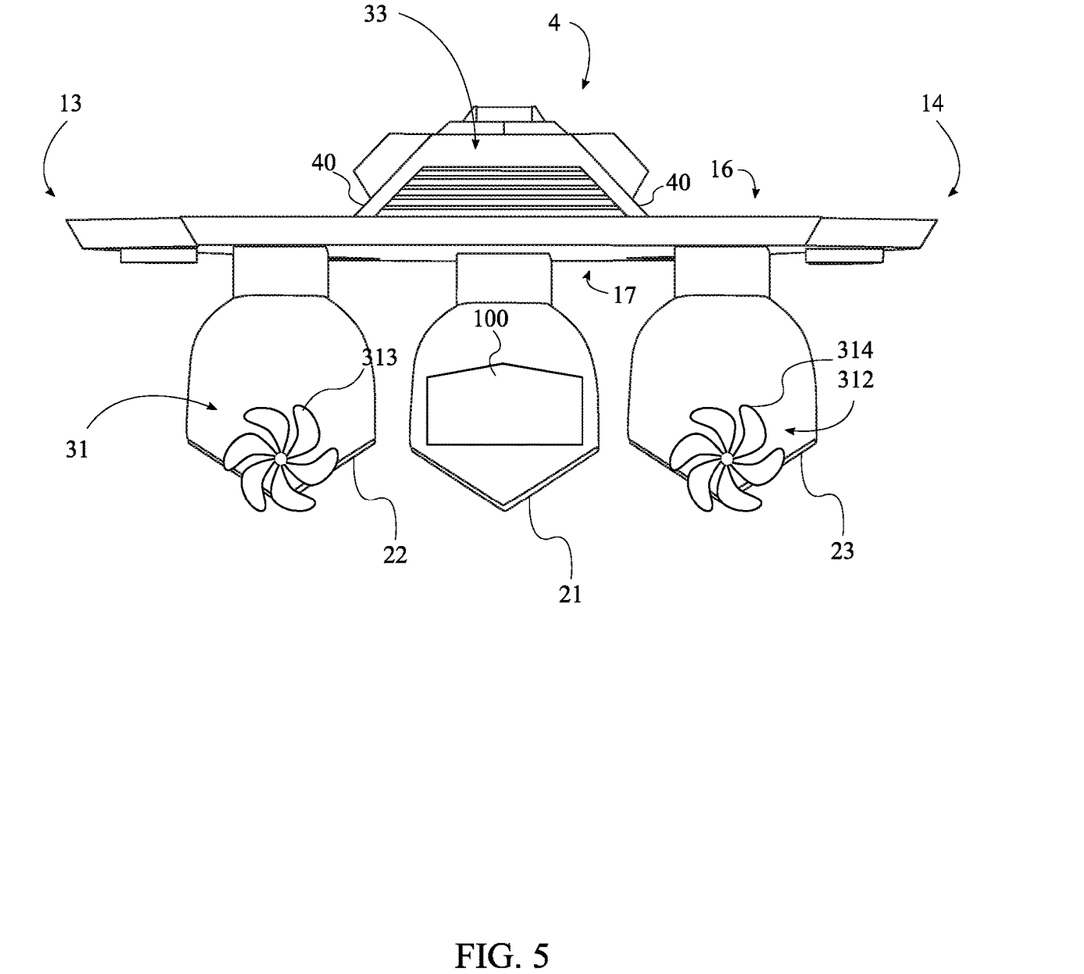
FIG. 5 is a rear view of one embodiment of the present invention.

Referring to FIGS. 2 and 5, in the preferred embodiment, the plurality of hulls 2 comprises a bow hull 21, a port hull 22, and a starboard hull 23, forming the trimaran configuration of the present invention. The bow hull 21 is positioned longitudinally adjacent to the bow 11 and is laterally symmetric about the longitudinal centerline 15. The port hull 22 is positioned longitudinally adjacent to the stern 12, and laterally adjacent to the port side 13. Conversely, the starboard hull 23 is positioned longitudinally adjacent to the stern 12, and laterally adjacent to the starboard side 14. The port hull 22 and the starboard hull 23 are positioned laterally symmetric about the longitudinal centerline 15. Further, the bow hull 21 is laterally positioned between the port hull 22 and the starboard hull 23. In some embodiments, the port hull 22 and starboard hull 23 may be configured to house crew members, fuel, munitions, and/or other items or structural configurations. Additionally, the bow hull 21 partially traverses from the bow 11 of the deck 1 to the stern 12. In the preferred embodiment, the bow hull 21 does not fully traverse the longitudinal dimension of the ship, but partially traverses approximately two third's the distance of the ship's total length from the bow 11 to the stern 12. In the preferred embodiment, the bow hull 21 houses deployable naval operations personnel, such that they exit the ship from a rear water tight storage bay garage door 100 during insertion operations. The aforementioned configuration of the plurality of hulls 2 minimizes wave interference and torque imposed on the ship that can be destructive to the plurality of hulls 2. Each of the plurality of hulls 2 comprises a fore portion 24 and an aft portion 25, with the fore portion 24 of each hull being positioned between the aft portion 25 and the bow 11 of the ship. In some embodiments, the fore portion 24 of the bow hull 21 is positioned longitudinally adjacent to the bow 11, and the aft portion 25 of the bow hull 21 is positioned longitudinally between the bow 11 and the fore portions 24 of the port hull 22 and the starboard hull 23. Preferably, the bow hull 21 longitudinally extends between one half and one third of a total longitudinal distance between the bow 11 and the stern 12.

In the preferred embodiment, the deck 1 comprises a first delta wing 18 and a second delta wing 19, each delta wing being positioned longitudinally adjacent to the bow 11. The first delta wing 18 and the second delta wing 19 are positioned laterally symmetrical about the longitudinal centerline 15. Further, the present invention comprises a first canard 50 and a second canard 52. The first canard 50 is integrated into the first delta wind, and the second canard 52 is integrated into the second delta wing 19. The first canard 50 and the second canard 52 are each operatively connected to a control system. More specifically, each of the first canard 50 and second canard 52 is an electronically controlled flap that provides additional lift for fine tuning the attitude of the bow hull 21 during high speed ship maneuvers. Furthermore, the canards help safeguard the ship from bow plunging.

Referring to FIGS. 1, and 3-6, in the preferred embodiment of the present invention, the plurality of propulsion stages 3 comprises a cruise propulsion stage 31, a wind assisted propulsion stage 32, and a vectored direct thrust propulsion stage 33. Each propulsion stage is independently operated and separate from the other stages. While it is contemplated that the placement and configuration of the plurality of propulsion stages 3 may vary, in the preferred embodiment, the cruise propulsion stage 31 is integrated into the stern 12 sides of the port hull 22 and starboard hull 23, the wind assisted propulsion stage 32 is integrated into the topside 16 of the deck 1, and the vectored direct thrust propulsion stage 33 is integrated into a stern end of the superstructure 4, and is further placed behind heat dissipating louvered shutters.

The cruise propulsion stage 31, a wind assisted propulsion stage 32, and a vectored direct thrust propulsion stage 33, may be alternatively referred to herein as a first, second and third stage, respectively. The first two stages, the cruise propulsion stage 31 and the wind assisted propulsion stage 32, determine the ship's cruise speed. At speed stage one, the ship is propelled at ten to thirty-five knots. At speed stage two, the ship is propelled at ten to twenty knots. The third stage is the ultra-fast propulsion system of the ship, which propels the ship from thirty-five to one hundred fifty knots. In the preferred embodiment of the present invention, the ships' three-stage propulsion system increases the ship's survivability and continued operational abilities should the vessel be hit by enemy ordinance. In the preferred embodiment of the present invention, the propulsion system primarily runs on jet fuel, but can also accommodate hydrogen/solar generators for alternative/hybrid fuel consumption applications. Furthermore, in some embodiments, the plurality of propulsion stages 3 may include a water jet propulsion system. In some embodiments, the water jet propulsion system may be comprised as the cruise propulsion stage 31. In some embodiments, the water jet propulsion system may be substituted for a propeller propulsion system as described hereinafter.

Figure 7:
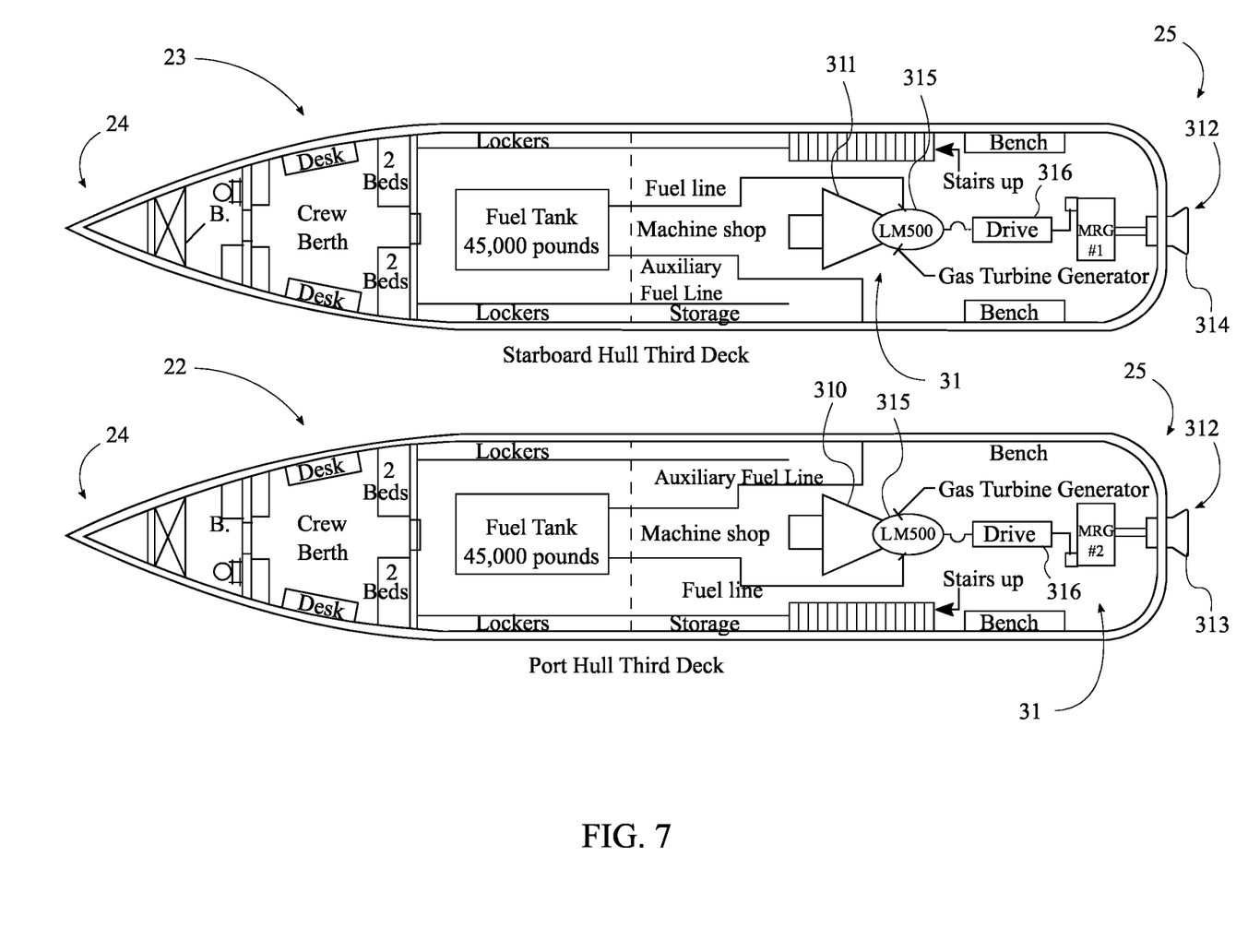
FIG. 7 is a plan view of the third decks of the port and starboard hulls in one embodiment of the present invention.
Figure 8:
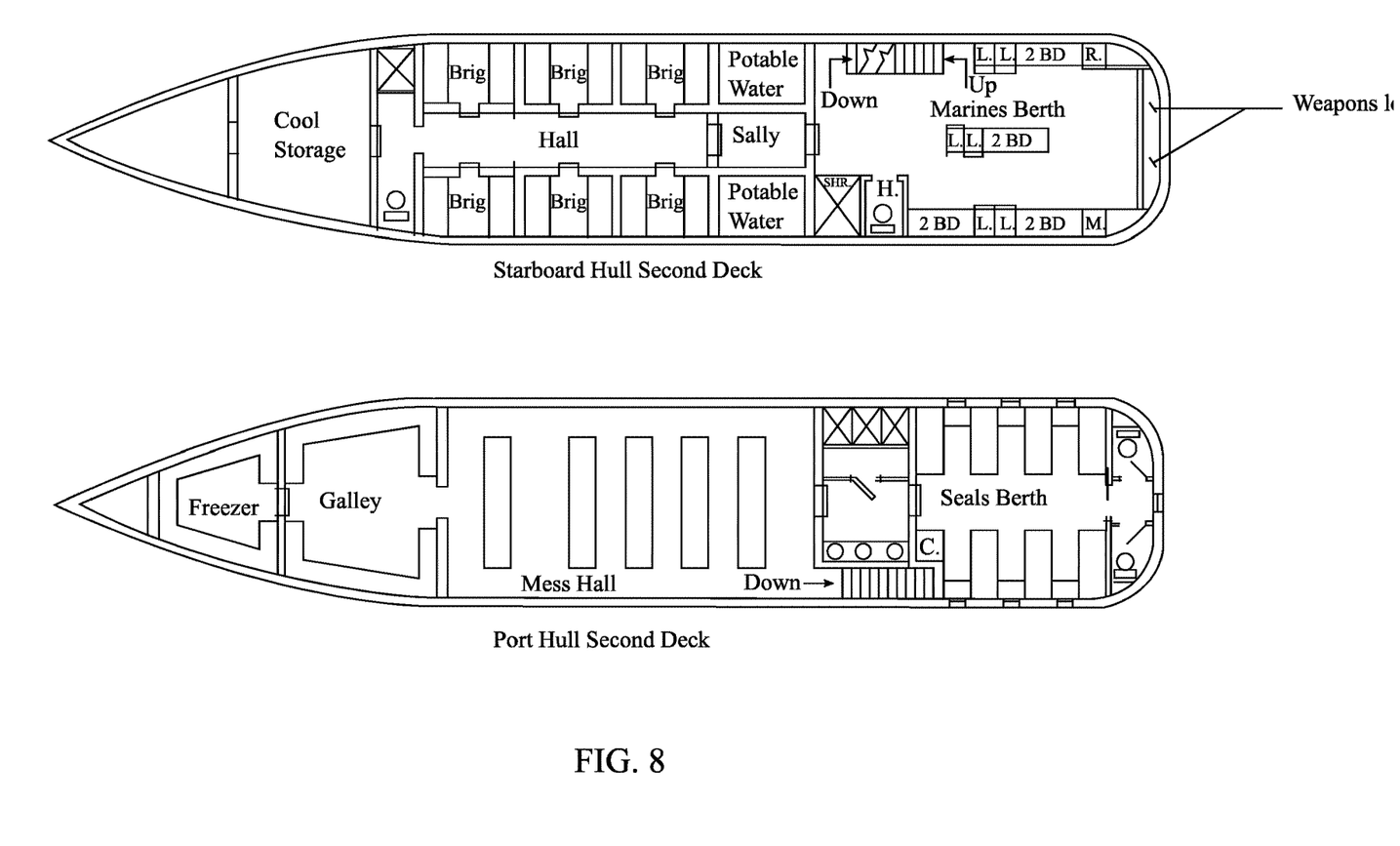
FIG. 8 is a plan view of the second decks of the port and starboard hulls in one embodiment of the present invention.
Figure 9:
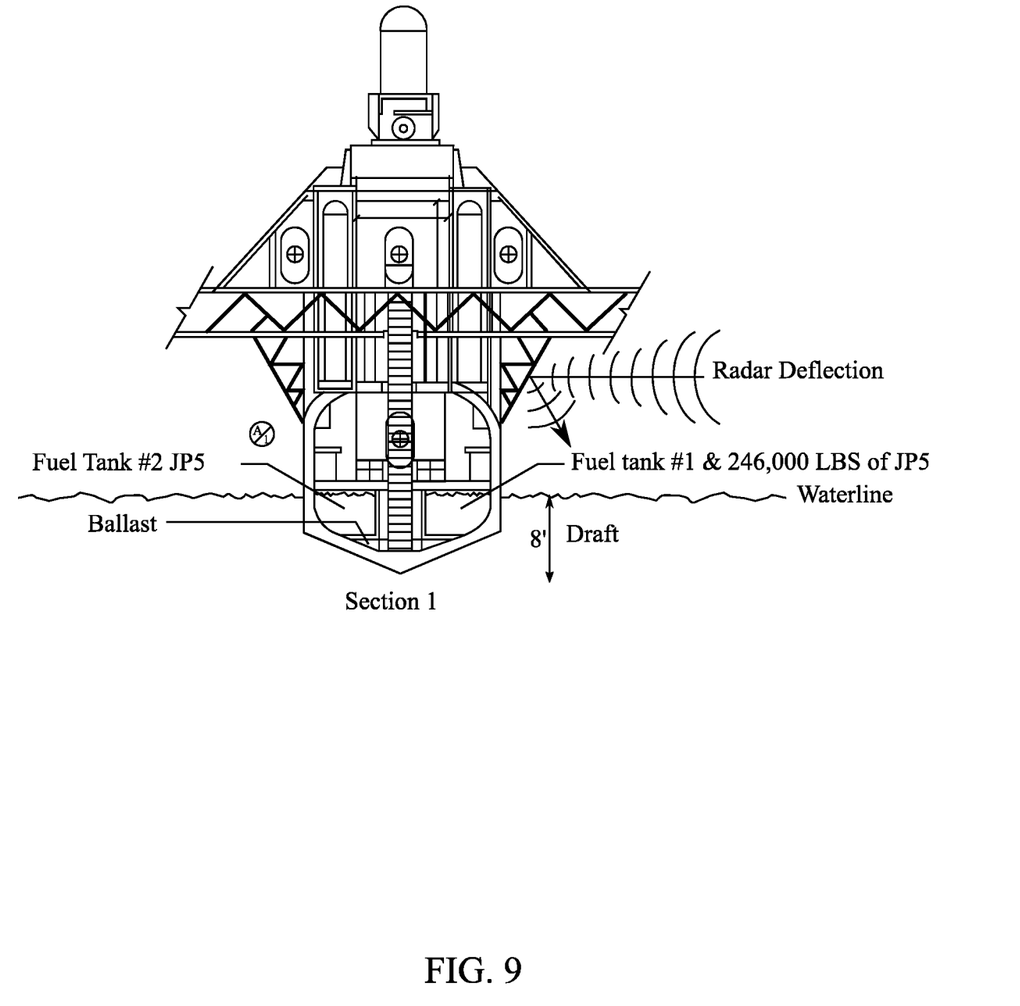
FIG. 9 is a front sectional view of one embodiment of the present invention illustrating the draft of the bow hull and radar deflection characteristics.

In the preferred embodiment, the cruise propulsion stage 31 comprises a first turbine 310 and a second turbine 311, as seen in FIG. 7. The first turbine 310 is positioned within the aft portion 25 of a lower deck 1 of the port hull 22, and the second turbine 311 is positioned within an aft portion 25 of a lower deck 1 of the starboard hull 23. The first turbine 310 and the second turbine 311 are operatively connected to at least one propeller 312.

Furthermore, the first turbine 310 and the second turbine 311 are each operatively connected to at least one generator 315. The at least one generator 315 is electrically connected to at least one motor 316, and each of the at least one motor 316 is operatively connected to one of the at least one propeller 312. More particularly, an output shaft of each of the at least one motor 316 is rotationally coupled to an input shaft of one of the at least one propeller 312. Furthermore, in some embodiments, the at least one propeller 312 comprises a port propeller 313 and a starboard propeller 314, as seen in FIG. 5. The port propeller 313 is externally connected to the aft portion 25 of the port hull 22, and the starboard propeller 314 is externally connected to the aft portion 25 of the starboard hull 23. During normal cruising operations utilizing stage one of the propulsion system, the first turbine 310 and the second turbine 311 drive the at least one generator 315, which in turn drives the at least one electric motor that turns the at least one propeller 312, propelling the ship at ten to thirty-five knots. In the preferred embodiment of the present invention, the first turbine 310 and the second turbine 311 take the form of an LM500 type gas turbine engine, however, in various embodiments, the first turbine 310 and the second turbine 311 may be any viable type of gas turbine engine.

The second stage of the propulsion system is a retractable wind assisted sail and rigging system that assists the ship in maintaining and/or achieving its cruise speed in conjunction with the first stage. When deployed, stage two of the propulsion system is initiated. During stage two, the second stage involves deploys three retractable masts, which in turn deploy three triangular sails that provide wind power assistance to the cruise gas turbine systems. In the preferred embodiment of the present invention, the second stage propels the ship at ten to twenty knots. This reduces fuel consumption and significantly reduces the ships heat signature.

Figure 3:
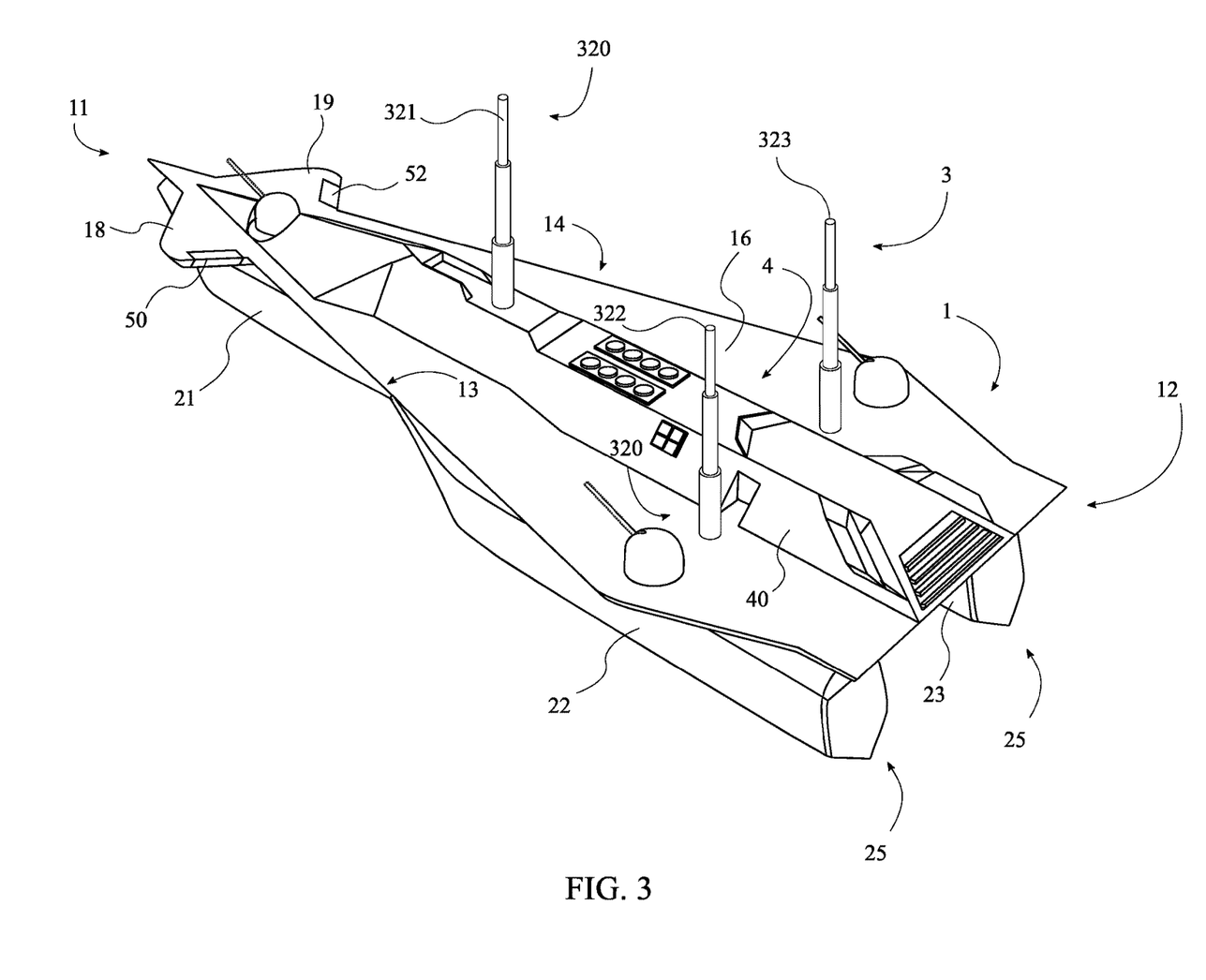
FIG. 3 is a raised perspective view of one embodiment of the present invention showing the retractable masts in an extended configuration.
Figure 4:
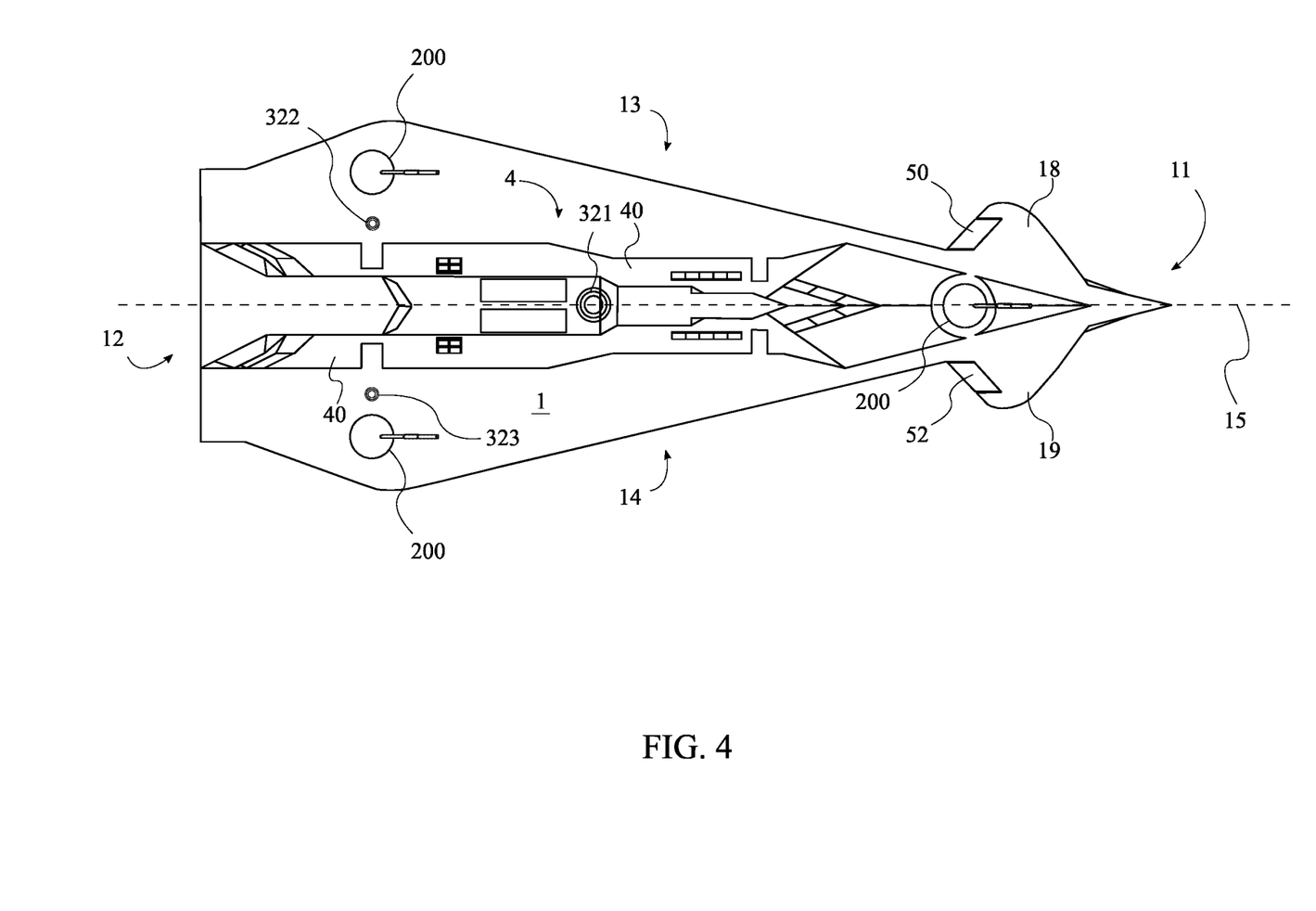
FIG. 4 is a top view of one embodiment of the present invention.

In the preferred embodiment, the wind assisted propulsion stage 32 comprises a plurality of retractable masts 320 as seen in FIG. 3, and each of the plurality of retractable masts 320 are integrated into the deck 1 adjacent to the topside 16 of the deck 1. The plurality of retractable masts 320 comprises a first retractable mast 321, a second retractable mast 322, and a third retractable mast 323. The first retractable mast 321 is positioned laterally along the longitudinal centerline 15, and longitudinally about midway between the bow 11 and the stern 12. The second retractable mast 322 and the third retractable mast 323 are positioned adjacent to the stern 12 and are positioned laterally symmetric about the longitudinal centerline 15. The second retractable mast 322 is positioned between the port side 13 and the longitudinal centerline 15, and the third retractable mast 323 is positioned between the starboard side 14 and the longitudinal centerline 15. In various embodiments, the position of the plurality of retractable masts 320 may vary.

Figure 6:
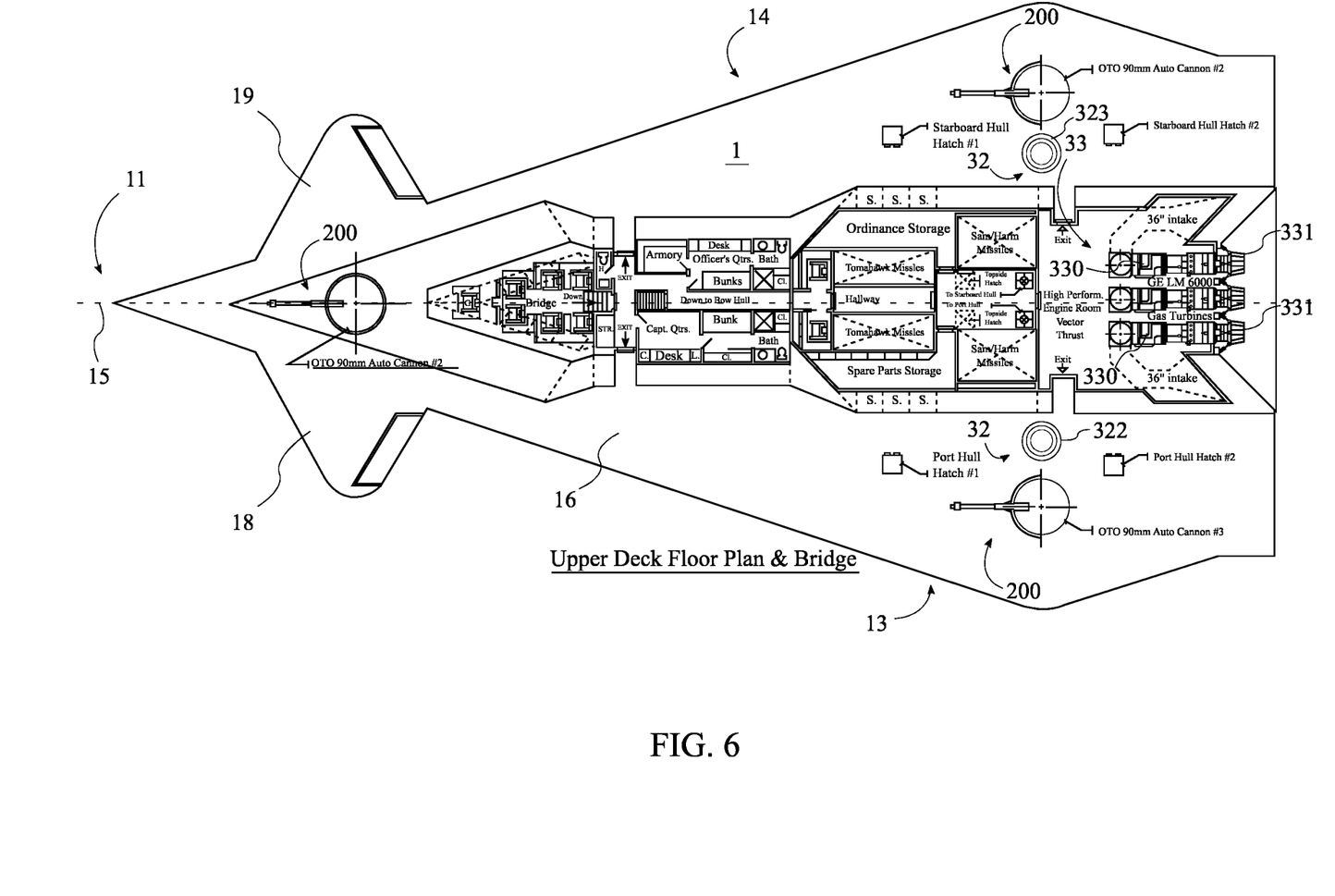
FIG. 6 is a plan view showing an internal upper deck floor plan of the superstructure in one embodiment of the present invention.

Referring to FIG. 6, the third propulsion stage is an ultra-fast jet propulsion system that propels the ship to a maximum speed of one hundred fifty knots. In the preferred embodiment, the vectored direct thrust propulsion stage 33 comprises a plurality of gas turbine engines 330 and a plurality of vector thrust nozzles 331. Each of the plurality of vector thrust nozzles 331 is operatively connected to one of the plurality of gas turbine engines 330 and oriented toward the stern 12. In the preferred embodiment of the present invention, the plurality of gas turbine engines 330 takes the form of the GE ACE gas type turbine engines; however, the plurality of gas turbine engines 330 may be any viable gas turbines or other suitable drivers in various embodiments. The plurality of vector thrust nozzles 331 is positioned at the stern 12 of the ship and is integrated on to the plurality of gas turbines. More specifically, the plurality of nozzles takes form of three-dimensional vector thrust nozzles to directionally control the ship in high speeds. At stage three, the plurality of nozzles works in conjunction with the plurality of gas turbine engines 330 to provide direct thrust to propel the ship forward. In the preferred embodiment of the present invention, the direct thrust of the third stage provides up to 80,000 pounds of thrust to propel the present invention to 150 knots. Additionally, the plurality of vector thrust nozzles 331 utilizes the direct thrust power generated by the plurality of gas turbines to perform the majority of bow 11 attitude maneuvers, in addition to driving the UFAS during high-speed mode. Furthermore, the plurality of vector thrust nozzles 331 adjusts the attitude/yaw of the ship.

Furthermore, the present invention may comprise a plurality of weapon emplacements 200. Each of the plurality of weapon emplacements 200 may be connected to the topside 16 of the deck 1, or in various other locations. In various embodiments of the present invention, the ship can comprise a plurality of mounts situated on the deck 1, opposite to the plurality of hulls 2. For military embodiments of the present invention, the plurality of mounts specifically secures the plurality of weapon emplacements 200. In some embodiments, the plurality of mounts can secure weapons at the stern 12 side of the deck 1, specifically at the starboard and port sides. This weapon system will be able to cover two hundred twenty degrees field of fire with a negative elevation of ten degrees and a positive elevation of seventy-five degrees. Additionally, the plurality of mounts can accommodate any current weapon system on top of the ship, providing 360 degrees hemispherical field of fire for close in and/or long-range aerial or surface ship threats.

The following is a supplementary description of the present invention intended to further illustrate the spirit of the present invention and should not be considering to be limiting, but rather exemplary.

The design of the present invention incorporates collectively a unique propulsion system, configuration, superstructure, and weapons configuration. However, the UFAS' Ultra-Fast speed capability, 150 knots, places itself in a class of its own. The 21st Century demands that our naval forces must be prepared for a wide range of technological and primitive naval threats. The UFAS can assist in providing an effective defense against surface ships, submarines, and aerial weapon platforms.

The UFAS is a blue water and littoral ship whose primary mission is to provide fleet protection outside of current naval defense perimeters. Working in "Wolf Packs," the UFAS can engage enemy forces well beyond the fleet's area of operation, thereby seriously depleting enemy forces effectiveness and strength long before they are able to effectively engage the fleet. Type 2 UFAS version is uniquely capable of launching 1 to 3 F35B VTOL fighters to engage enemy threats hundreds of miles from the fleet inflicting high attrition on the enemy before it can engage the main fleet.

Secondary roles for the present invention may include:

Navy Seal operations: Since the UFAS has a shallow draft of approximately six feet, type 1 UFAS can provide close to shore insertion and extraction operations in support of Navy Seal teams, in addition to blue water operations. The Ultra-Fast capabilities and long range allows for delivering Seal Teams quickly and stealthily and then the UFAS may have the option of remaining within over-the-horizon striking range. The UFAS can be an effective element to the Rapid Forces Deployment operations.

Coastal defense: Anti-Submarine operations off the coast of the United States is of significant concern. The UFAS is ideal for detecting and destroying submarine threats. Smuggler interdiction is an important role for the UFAS. Its presence would be a strong deterrence to drug smugglers and any other types of smuggling operations.

Search and rescue: The use of the UFAS for Search and Rescue operations would save lives during naval blue water operations and coastal operations because of its speed and shallow draft.

The necessary composite materials utilized in the UFAS have reached a level of maturity needed to withstand the stresses, loads and vibratory affects created during high speed operations of 150 knots. The dominate hull and superstructure materials are composites and using least amount of aluminum to lessen the UFAS' signature. The incorporation of composites will allow for more payload and/or fuel efficiency and this translates into more ordinance on target, longer range, and more Seal Teams. Thickened composite materials can act as armor in vital areas.

Hull and superstructure configurations: The UFAS is a trimaran ship that consists of a forward bow hull, port hull, and starboard hull. The UFAS incorporates a symmetrical tri-hull system, meaning all three hulls are the same size. Unlike current Tri-Hull ships, the bow hull does not run the entire length of the ship, rather it terminates ⅓ the distance of the total length from the stern. This hull configuration minimizes "Wave Interference and Torque" that can be destructive to a trimaran hull system. The tri-hull system incorporates a composite "delta wing" (It is not a wing-in-ground-effect) deck system providing lift, which lowers the drag factor while the hulls are shifting from cruise operating speeds to high speed planing operations. The three hulls are designed with 25 degrees cut in the deck rise to assist in slicing through waves. The cut angle lessens as it reaches the stern to allow for efficient planing. A large canard with electronically controlled flaps has been integrated into the deck system and is positioned forward of the bow gun to provide additional lift for fine tuning the attitude of the bow hull during high speed maneuvers. The canard helps safeguard from bow plunging. The high-speed system is the Direct Thrust 3-Dimensional Vector gas turbines. The vectored thrust engines perform the majority of bow attitude in addition to driving the UFAS during the high-speed mode. The angular superstructure rising up from the wing deck system creates a stealth profile to help defeat radar detection. The superstructure houses the captain's bridge, officer's quarters, electronics, missile weapon systems, CWISP close in defense system. As mentioned, the three gas turbines at the stern of the superstructure power the UFAS during ultra-fast operations; the 3-dimensional vector thrust engines control the UFAS' hulls attitude during critical ultra-fast maneuvers. The port and starboard hulls house crew members, fuel, and munitions. The bow hull houses several Seal Teams and they exit the UFAS from the rear water tight garage door during insertion operations.

3 propulsions systems: The UFAS Propulsion Systems are based upon a three-stage system. During normal cruising operations or Stage 1 the UFAS is powered by two LM500 (type) gas turbine engines. One gas turbine is stationed in the stern of the lower deck of the starboard hull and the other gas turbine is stationed in the stern of the lower deck of the port hull. The gas turbines drive a generator which in turn drives an electric motor that turns the shafts and props. During the cruise mode Stage 2 the three retractable masts deploy three triangular sails that provide wind power assist to the cruise gas turbine systems. When deployed the sails obviously reduce fuel consumption and significantly reduce the ships heat signature. The Stage 3 propulsion system is powered by GE ACE (type) gas turbine engines using direct thrust jet power with 3-dimensional vector thrust nozzles to adjust attitude/yaw of the ship. The direct thrust engines will provide up to 80,000 pounds of thrust to propel the UFAS to 150 knots.

Summary of Propulsion Systems:

GE LM500 turbines (type) engines for cruise mode;

3 retractable mast and sails for power assist during cruise mode;

GE ace gas turbine (type) engines for ultra-fast mode; and

Onboard hydrogen production for alternative fuel.

The following is a list of specifications of the present invention according to one or more exemplary embodiments.

| CLASS: ULTRA FAST ATTACK SHIP (UFAS) | |
|---|---|
| SPECIFICATIONS | |
| TYPE 1: M1S | TRIMARAN (SURFACE SHIP) |
| TYPE 2: M2FB | TRIMARAN (1-3 F35B AIRCRAFT OR HELICOPTERS) |
| PROPULSION STAGE 1 | CRUISE SPEED 2 LM500 TYPE GE GAS TURBINES |
| PROPULSION STAGE 2 | RETRACTABLE MAST AND SAILS FOR WIND ASSIST |
| PROPULSION STAGE 3 | ULTRA FAST SPEED GE ACE TYPE GAS TURBINE ENGINES WITH 3-DIMENSIONAL VECTOR THRUST NOZZLES |
| SPEED STAGE 1 | 10 TO 35 KNOTS |
| SPEED STAGE 2 | CRUISE ASSIST WIND PROPULSION 10 TO 20 KNOTS |
| SPEED STAGE 3 | 35 KNOTS TO 150 KNOTS |
| DISPLACEMENT | DRY 400 TONS - WET 700 TONS |
| BEAM | 90 FEET |
| BOW TO STERN | 208 FEET |
| HEIGHT | 22 FEET |
| DRAFT | 6 FEET |
| STEALTH ARCHITECTURE | 60 DEGREES ANGULAR SUPERSTRUCTURE |
| STEALTH MATERIALS | COMPOSITES, RADAR ABORBANT SKIN |
| ARMORMENTS | TO BE DETERMINED |
| CREW COMPLIMENT | 7 OFFICERS AND 45 CREW MEMBERS |
| CRUISE RANGE | 6000 NAUTICAL MILES |
| FUEL TYPE 1 | JP5 JET FUEL |
| FUEL TYPE 2 | HYDROGEN (ONBOARD SOLAR PRODUCED HYDROGEN) |
| POUNDS OF FUEL | 150,000 LBS |
| GALLONS OF FUEL | 22,500 GALS |

In conclusion, the UFAS is a unique aggressive seaworthy multi-mission naval platform that is both a blue water and littoral offensive and defensive ship. Effective fleet protection is a vital need in the age of high-tech weapons, it is well suited for Search and Rescue, minesweeping, patrolling narrow bodies of water like the South China Sea, Red Sea, Persian Gulf and Mediterranean Sea. Just as important is the fact that the UFAS is an economical ship to build. It is easily maintained, it has low operational costs, and is designed to have a high survivability rate. The trimaran hull system has been proven to very stable in rough seas. The UFAS naval platform changes methodologies and tactics of modern naval warfare. In addition, it offers new capabilities for commercial requirements, and private yachts.

Although the invention has been explained in relation to its preferred embodiment, it is to be understood that many other possible modifications and variations can be made without departing from the spirit and scope of the invention as hereinafter claimed.

What is claimed is:
1. An ultra-fast trimaran naval ship comprising:
a deck;
a plurality of hulls;
a plurality of propulsion stages;
a superstructure;
the deck extending longitudinally between a bow and a stern;
the deck extending laterally between a port side and a starboard side;
the deck being laterally symmetric about a longitudinal centerline;
the superstructure being connected to a topside of the deck;
each of the plurality of hulls being connected to an underside of the deck opposite the superstructure;
each of the plurality of hulls being oriented longitudinally;
the plurality of hulls comprising a bow hull, a port hull, and a starboard hull;
the bow hull being positioned longitudinally adjacent to the bow;
the bow hull being positioned laterally symmetric about the longitudinal centerline;
the bow hull longitudinally extends between one half and one third of a total longitudinal distance between the bow and the stern;
the port hull and the starboard hull being positioned longitudinally adjacent to the stern;
the port hull being positioned laterally adjacent to the port side;
the starboard hull being positioned laterally adjacent to the starboard side;
the port hull and the starboard hull being positioned laterally symmetric about the longitudinal centerline;
the bow hull being laterally positioned between the port hull and the starboard hull;
each of the bow hull, the port hull and the starboard hull comprising a fore portion and an aft portion;
the fore portion of the bow hull being positioned longitudinally adjacent to the bow;
the aft portion of the port hull being positioned longitudinally adjacent to the stern;
the aft portion of the starboard hull being positioned longitudinally adjacent to the stern;
the aft portion of the bow hull being positioned longitudinally between the fore portion and the aft portion of the port hull;
the aft portion of the bow hull being positioned longitudinally between the fore portion and the aft portion of the starboard hull;
the plurality of propulsion stages comprising a cruise propulsion stage, a wind assisted propulsion stage, and a vectored direct thrust propulsion stage;
the cruise propulsion stage being integrated into the port hull and the starboard hull;
the wind assisted propulsion stage comprising a plurality of retractable masts and each of the plurality of retractable masts being integrated into the deck; and the vectored thrust propulsion stage comprising a plurality of gas turbine engines and a plurality of vector thrust nozzles; and each of the plurality of vector thrust nozzles being operatively connected to one of the plurality of gas turbine engines and integrated into a stern end of the superstructure.

2. The ultra-fast trimaran naval ship as claimed in claim 1 comprising:
the deck comprising a first delta wing and a second delta wing;
the first delta wing and the second delta wing being positioned longitudinally adjacent to the bow; and
the first delta wing and the second delta wing being positioned laterally symmetrical about the longitudinal centerline.

3. The ultra-fast trimaran naval ship as claimed in claim 2 comprising:
the deck comprising a first canard and a second canard;
the first canard being integrated into the first delta wing;
the second canard being integrated into the second delta wing; and
the first canard and the second canard being operatively connected to a control system.

4. The ultra-fast trimaran naval ship as claimed in claim 1 comprising:
the superstructure comprising a plurality of external walls; and
each of the plurality of external walls being connected to the deck at a 60-degree angle.

5. The ultra-fast trimaran naval ship as claimed in claim 4 comprising:
each of the plurality of external walls being armored.

6. The ultra-fast trimaran naval ship as claimed in claim 1 comprising:
each of the plurality of hulls comprising a 20 to 25-degree angular cut in a deck rise.

7. The ultra-fast trimaran naval ship as claimed in claim 1 comprising:
at least one of the plurality of hulls comprising a rear water tight storage bay garage door.

8. The ultra-fast trimaran naval ship as claimed in claim 1 comprising:
the cruise propulsion stage comprising at least one propeller, a first turbine and a second turbine;
the first turbine being positioned within the aft portion of the port hull;
the second turbine being positioned within the aft portion of the starboard hull; and
the first turbine and the second turbine being operatively connected to the at least one propeller.

9. The ultra-fast trimaran naval ship as claimed in claim 8 comprising:
the at least one propeller comprising a port propeller and a starboard propeller;
the port propeller being externally connected to the aft portion of the port hull;
the starboard propeller being externally connected to the aft portion of the starboard hull.

10. The ultra-fast trimaran naval ship as claimed in claim 8 comprising:
the cruise propulsion stage comprising at least one generator and at least one motor;
the first turbine and the second turbine being operatively connected to the at least one generator;
the at least one generator being electrically connected to the at least one motor; and
each of the at least one motor being operatively connected to one of the at least one propeller.

11. The ultra-fast trimaran naval ship as claimed in claim 1 comprising:
the plurality of retractable masts comprising a first retractable mast, a second retractable mast, and a third retractable mast;
the first retractable mast being positioned longitudinally adjacent to the bow along the longitudinal centerline;
the second retractable mast and the third retractable mast being positioned adjacent to the stern; and
the second retractable mast and the third retractable mast being positioned laterally symmetric about the longitudinal centerline.

12. The ultra-fast trimaran naval ship as claimed in claim 1 comprising:
a plurality of weapon emplacements; and
each of the plurality of weapon emplacements being connected to the topside.

* * * * *